(12) United States Patent
Noureddine et al.

(10) Patent No.: US 8,752,027 B2
(45) Date of Patent: Jun. 10, 2014

(54) INJECTING FAULTS INTO PROGRAM FOR TESTING SOFTWARE

(75) Inventors: Sadek A. Noureddine, Irvine, CA (US); Artem Yegorov, Aliso Viejo, CA (US)

(73) Assignee: Microsoft Corporation, Redmond, WA (US)

(*) Notice: Subject to any disclaimer, the term of this patent is extended or adjusted under 35 U.S.C. 154(b) by 308 days.

(21) Appl. No.: 13/231,958

(22) Filed: Sep. 14, 2011

(65) Prior Publication Data
US 2013/0067439 A1   Mar. 14, 2013

(51) Int. Cl.
*G06F 9/44* (2006.01)

(52) U.S. Cl.
USPC ............................ 717/130; 717/127; 717/128

(58) Field of Classification Search
USPC .................................................. 717/124–132
IPC ..................... G06F 11/004,11/30, 11/51, 11/55, G06F 11/79, 11/82, 11/2273, 11/3003
See application file for complete search history.

(56) References Cited

U.S. PATENT DOCUMENTS

| | | | |
|---|---|---|---|
| 6,263,491 B1 * | 7/2001 | Hunt ............................ | 717/130 |
| 6,698,012 B1 * | 2/2004 | Kossatchev et al. .......... | 717/126 |
| 6,745,383 B1 * | 6/2004 | Agarwal et al. ............... | 717/132 |
| 6,957,422 B2 * | 10/2005 | Hunt ............................ | 717/130 |
| 6,988,264 B2 * | 1/2006 | Sarma et al. .................. | 717/128 |
| 7,275,239 B2 * | 9/2007 | Cuomo et al. ................ | 717/130 |
| 7,536,605 B2 | 5/2009 | Keaffaber et al. | |
| 7,685,570 B2 * | 3/2010 | Draine et al. ................. | 717/125 |
| 7,757,215 B1 | 7/2010 | Zhou et al. | |
| 7,779,298 B2 * | 8/2010 | Challenger et al. ............ | 714/15 |
| 7,823,135 B2 * | 10/2010 | Horning et al. ............... | 717/127 |
| 7,827,541 B2 * | 11/2010 | Chen et al. .................... | 717/130 |
| 7,945,898 B1 * | 5/2011 | Episkopos et al. ............ | 717/124 |
| 7,984,429 B2 * | 7/2011 | Hunt ............................ | 717/130 |
| 8,161,463 B2 * | 4/2012 | Johnson et al. ............... | 717/136 |
| 8,271,949 B2 * | 9/2012 | Bernardini et al. ........... | 717/124 |
| 8,375,370 B2 * | 2/2013 | Chaar et al. ................... | 717/130 |
| 2010/0287535 A1 | 11/2010 | Kim et al. | |

OTHER PUBLICATIONS

Liu et al, "Selecting Checkpoints along the Time Line: A Novel Temporal Checkpoint Selection Strategy for Monitoring a Batch of Parallel Business Processes", IEEE, pp. 1281-1284, 2013.*
Fischmeister et al, "Sampling-based Program Execution Monitoring", ACM, pp. 133-142, 2010.*
McKechnie et al, "Debugging FPGA-based Packet Processing Systems through Transaction-level Communication-centric Monitoring", ACM, pp. 129-136, 2009.*
Wen et al, "NUDA: A Non-Uniform Debugging Architecture and Non-Intrusive Race Detection for Many-Core" ACM, pp. 148-153, 2009.*
Dimaggio, Len., "Fault Injection Testing—First Steps with JBoss Byteman", Retrieved at <<http://java.dzone.com/news/fault-injection-testing-first>>, Oct. 16, 2009, pp. 5.

(Continued)

*Primary Examiner* — Anil Khatri
(74) *Attorney, Agent, or Firm* — Nicholas Chen; Kate Drakos; Micky Minhas

(57) ABSTRACT

Aspects of the subject matter described herein relate to injecting faults into programs for testing. In aspects, a program is instrumented with instrumentation points. A request that an exception be raised at an instrumentation point is received. In response, a sink is configured to listen for the event associated with the instrumentation point. The sink is further configured to cause the exception to be raised to the program in response to receiving the event. The exception may be raised without modifying code of the program.

20 Claims, 5 Drawing Sheets

(56) References Cited

OTHER PUBLICATIONS

Ambrosio, et al., "Designing Fault Injection Expeiments using State-based Model to test a Space Software", Retrieved at <<http://citeseerx.ist.psu.edu/viewdoc/download?doi=10.1.1.93.4008&rep=rep1&type=pdf>>, Proceedings of Third Latin-American Symposium on Dependable Computing, Sep. 26-28, 2007, pp. 13.

Tsai, et al., "Path based fault injection", Retrieved at <<http://citeseerx.ist.psu.edu/viewdoc/download?doi=10.1.1.39.898&rep=rep1&type=pdf>>, Proceedings of 3rd ISSAT InternationalConference on Reliability and Quality in Design, Retrieved Date: Aug. 6, 2011, pp. 5.

Bieman, et al., "Using Fault Injection to Increase Software Test Coverage", Retrieved at <<http://www.cs.colostate.edu/~bieman/Pubs/issre96preprint.pdf>>, Proceedings of the The Seventh International Symposium on Software Reliability Engineering, Nov. 2, 1996, pp. 9.

Buikema, Brian., "Unit Testing", Retrieved at <<http://blog.brianbuikema.com/category/unit-testing/>>, Retrieved Date: Jun. 9, 2011, pp. 5.

\* cited by examiner

INJECTING FAULTS INTO PROGRAM FOR TESTING SOFTWARE

BACKGROUND

Software developers are often tasked with developing and testing software. Properly testing software, however, is challenging. Because of the many paths a program may take, often code is shipped that has not been tested for all the possible paths. Adding debug code to a program either at development time or at execution time may introduce additional bugs into the program.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to injecting faults into programs for testing. In aspects, a program is instrumented with instrumentation points. A request that an exception be raised at an instrumentation point is received. In response, a sink is configured to listen for the event associated with the instrumentation point. The sink is further configured to cause the exception to be raised to the program in response to receiving the event. The exception may be raised without modifying code of the program.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrase "first version" and "second version" does not necessarily mean that the first version is the very first version or was created before the second version or even that the first version is requested or operated on before the second versions. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
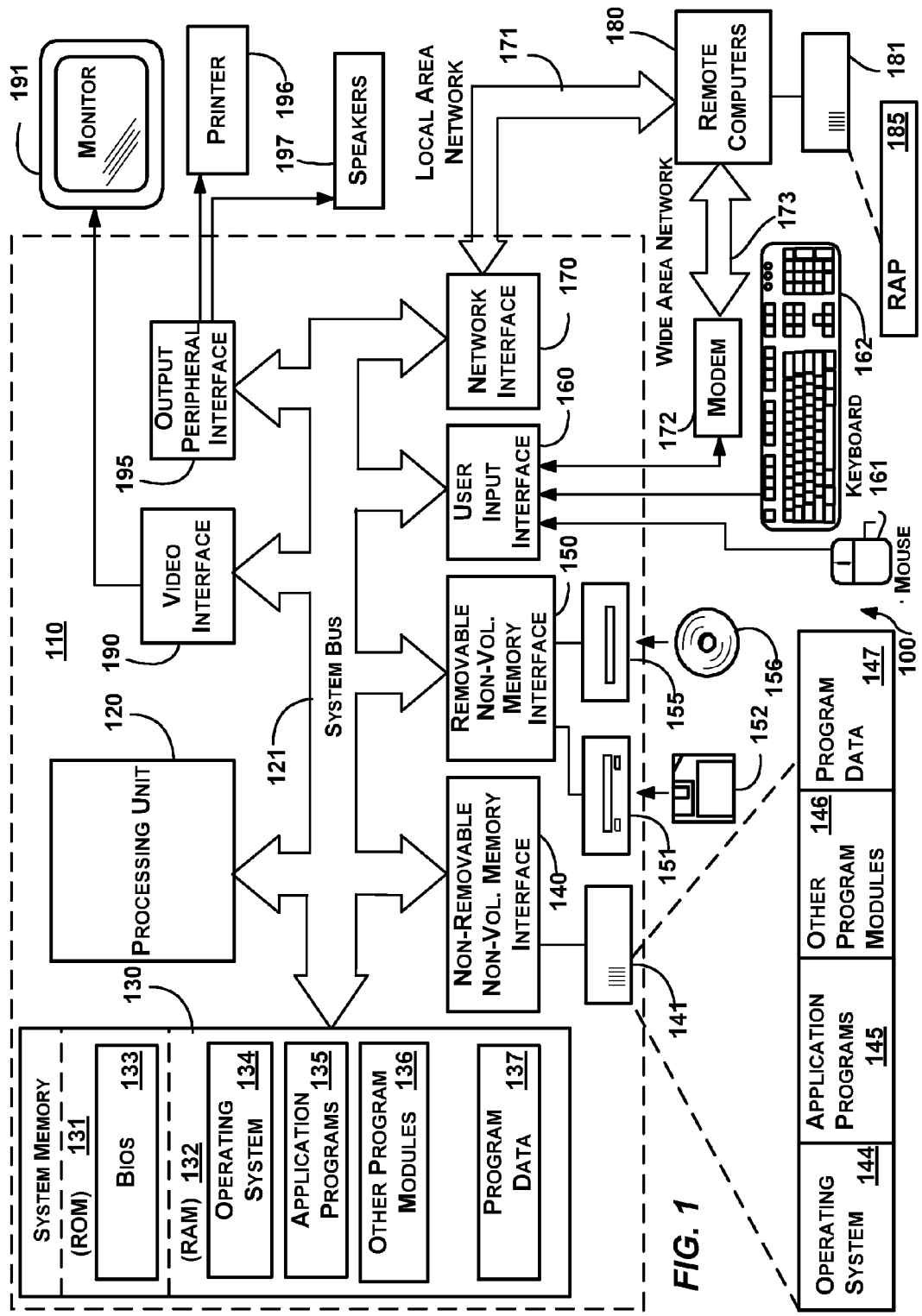
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Fault Injection

Figure 2:
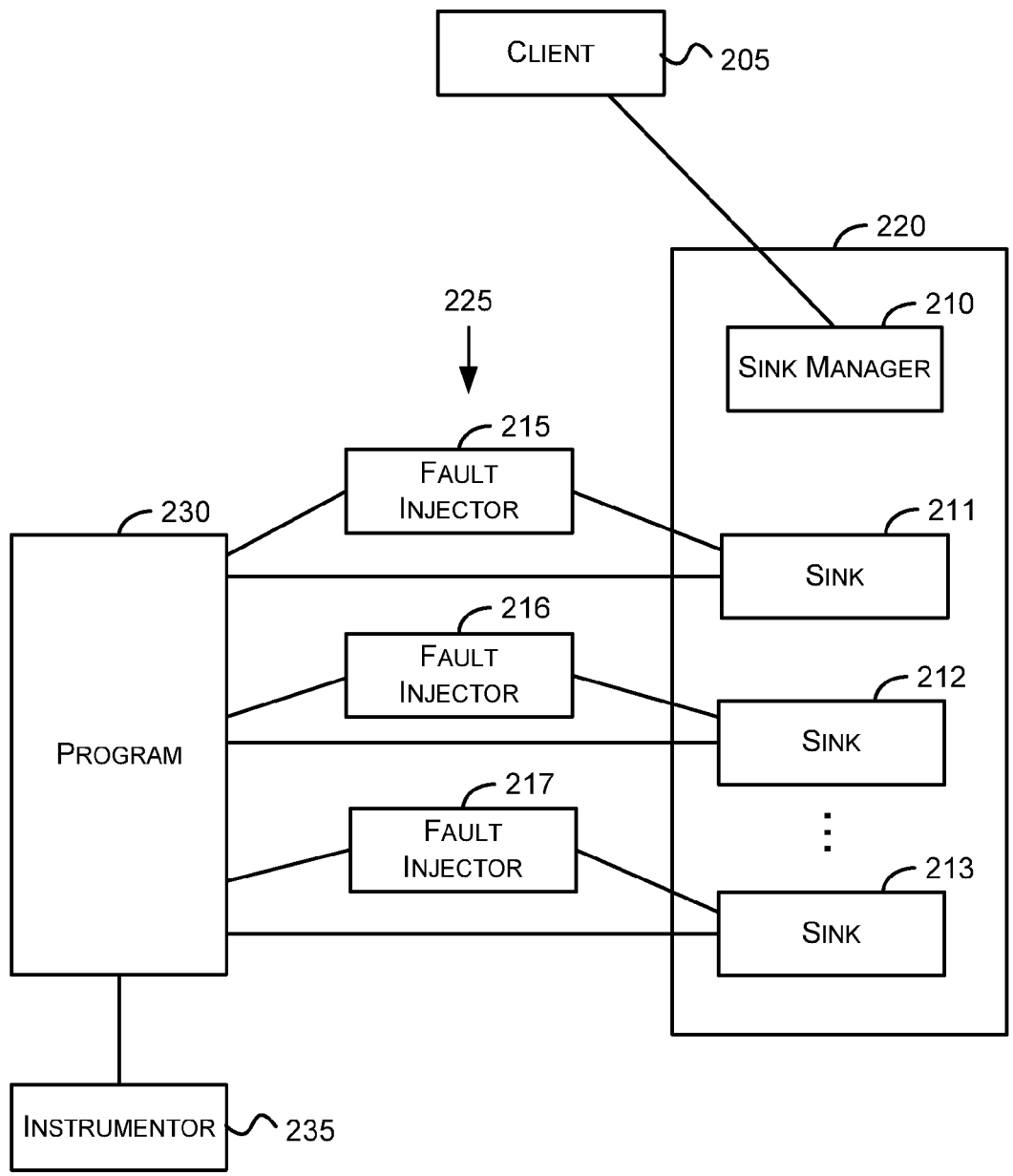
FIG. 2 is a block diagram that represents an exemplary environment in which aspects of the subject matter described herein may be implemented.

As mentioned previously, testing software is challenging. FIG. 2 is a block diagram that represents an exemplary environment in which aspects of the subject matter described herein may be implemented. The components illustrated in FIG. 2 are exemplary and are not meant to be all-inclusive of components that may be needed or included. In other embodiments, the components described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

As used herein, the term component is to be read to include hardware such as all or a portion of a device, a collection of one or more software modules or portions thereof, some combination of one or more software modules or portions thereof and one or more devices or portions thereof, and the like. A component may include or be represented by code.

The components illustrated in FIG. 2 may be implemented using one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to implement the components of FIG. 2 comprises the computer 110 of FIG. 1.

Turning to FIG. 2, the environment may include a client 205, sink components 220, fault injector components 225, a program 230, and an intrumentor 235. The sink components 220 may include a sink manager 210 and one or more sinks 211-213. The fault injector components 225 may include one or more fault injectors 215-217.

The program 230 may be implemented in hardware and/or software. Software may include code that indicates actions a computer is to take. Code may also include data, resources, variables, definitions, relationships, associations, and the like that include information other than actions the computer is to take. For example, code may include images, Web pages, HTML, XML, other content, and the like. Actions indicated by the code may be encoded in a source code language, intermediate language, assembly language, binary code, other language, some combination of the above, and the like.

When the program 230 or any portion thereof is implemented in software, the program may be stored on a storage device (not shown) such as a hard disk or other storage device described in conjunction with FIG. 1. The program may be executed by a processor (not shown) also described in conjunction with FIG. 1. If an event is enabled, the processor may generate an event (e.g., by executing event code) in conjunction with executing a line of code of the program that is associated with an instrumentation point.

The program 230 may be instrumented through the instrumentor 235. Instrumentation refers to defining a set of one or more events in the code. For example, the set of events may indicate entry and exit points to routines, setting and changing of variable values, calls made to methods, establishment and termination of connections, or any other action taken by the code. An event may be associated with any line of code, an action taken by code, sub actions associated with a line of code (e.g., where a line of code may be implemented by multiple machine code actions), or the like. Instrumenting code may involve identifying a code location within the program for each of the instrumentation points and associating one or more events with the instrumentation points In one embodiment, the instrumentor 235 may be a software development tool that automatically or semi-automatically determines code locations and events based on program metadata (e.g., function or method names, files names, variable names, other metadata, program statements, and the like). In another embodiment, the instrumentor 235 may be a user interface. The user interface may receive user input by which a software developer may manually define events within the code by identifying code locations and events. In some embodiments, the instrumentor 235 may allow both automatic and manual instrumentation of the program 230.

The program 230 may be executed within a framework (not shown) that allows events of the program to be enabled or disabled as desired. For example, the program 230 may be executed in a framework that manages memory (e.g., allocations and freeing of memory) and other resource of the program 230, compiles (e.g., just in time) and executes the code of the program 230, that provides an eventing framework for the program 230, and the like.

When an event is enabled for an instrumentation point, the event is raised if the program 230 reaches (e.g., executes, begins to executes, has executed, is about to execute, or the like) the instrumentation point. When an event is disabled, no event may be raised in response to the program 230 reaching the instrumentation point associated with the event.

When the program 230 executes, the program 230 (or a framework hosting the program 230) may generate an event at an instrumentation point. If a sink has been configured to receive the event, the sink may receive notification of the event. In response, the sink may cause a fault injector to raise an exception within the program 230 at the point of execution within the program 230 associated with the event. The exception may appear to the program 230, for all intents and purposes, to be a normally generated exception while in reality the exception has been generated by a fault injector. The program 230 may then respond to the exception as the program has been programmed to do.

Raising the exception to the program 230 may be performed without modifying binary, byte, source, or other code of the program. This is helpful as modifying code of the program 230 may alter the behavior of the program 230 in such a way as to introduce new bugs.

A sink is a component that is configured to listen for (e.g., receive, obtain, or the like) a notification of an event. The event is associated with code of the program 230. After it receives a notification of an event, the sink may cause an exception to be raised in the program 230. In one embodiment, the sink may itself raise the exception in the program 230. In another embodiment, the sink may cause the exception to be raised by instructing a fault injector 215 to raise an exception within the program.

The sink manager 210 may associate one or more sinks with an event of the program 230. The sink manager 210 may associated one or more events with a sink. The sink manager 210 may expose an interface by which the client 205 may request that a sink be configured to listen for an event of the program 230. The interface may allow the client to indicate an event (e.g., by passing an identifier of the event) and exception data that indicates the exception that is to be raised in response to receiving the event. Using this data the client passes, the sink manager 210 may configure (e.g., instantiate, change properties of, execute, awaken, or the like) a sink to listen to the event and to cause the sink to cause an exception to be raised in response to receiving the event.

An exception provides a way for a program to indicate that an action did not execute normally. For example, an exception may be raised to indicate that a file operation failed. As another example, an exception may be raised to indicate that memory could not be allocated as requested. The above examples are exemplary only. Based on the teachings herein, those skilled in the art will recognize many other exceptions that may be raised without departing from the spirit or scope of aspects of the subject matter described herein.

In testing a program, the ability to raise an exception in accordance with aspects of the subject matter described herein, provides a tester with an opportunity to test if a program handles the exception properly. Instead of creating conditions which will cause the exception to occur (e.g., filling a disk, allocating memory, causing a network error, or the like), the sink manager 210 allows a client 205 to cause an exception to occur at any instrumented point in the program 230.

In one embodiment, the fault injector components 225 may be implemented with a separate component for each exception that is to be raised to the program 230. In another embodiment, the fault injector components 225 may be implemented as a set of one or more components that are capable of raising any exception indicated by the sinks 211-213. A fault injector may be a component that is part of the program 230, part of a framework in which the program 230 executes, a component separate from the program 230 and framework, or the like.

A fault injector may raise an exception in the program 230 that appears to the program 230 to occur in conjunction with the program executing code associated with an instrumentation point. For example, a fault injector may be able to raise an exception in parallel with a line of code associated with an instrumentation point being executed, after the line of code has been executed but before any other line of code is executed in the program 230, or a configurable time after a line of code is executed. For example, in one implementation, after raising an event to which a listener has been assigned, the program 230 may wait (or be caused to wait) until it receives a message that the event has been processed before the next line of code in the program 230 is executed.

The sinks 211-213 are components that are configured to receive notification of events as described previously. In response to receiving an event, a sink may cause an exception to be raised in the program 230 by instructing the appropriate fault injector.

The client 205 may be implemented using a set of one or more components that seek to raise exceptions in the program 230. In one embodiment, the client 205 may be implemented as a Web browser that interfaces with the sink manager 210 to enable, disable, and configure sinks as desired. Using the browser, a software developer may provide input that indicates event identifiers and exceptions associated with the event identifiers. In another embodiment, the client 205 may be implemented as part of a test harness that tests behavior of the program 230 in response to exceptions raised via the sink components 220.

Figure 3:
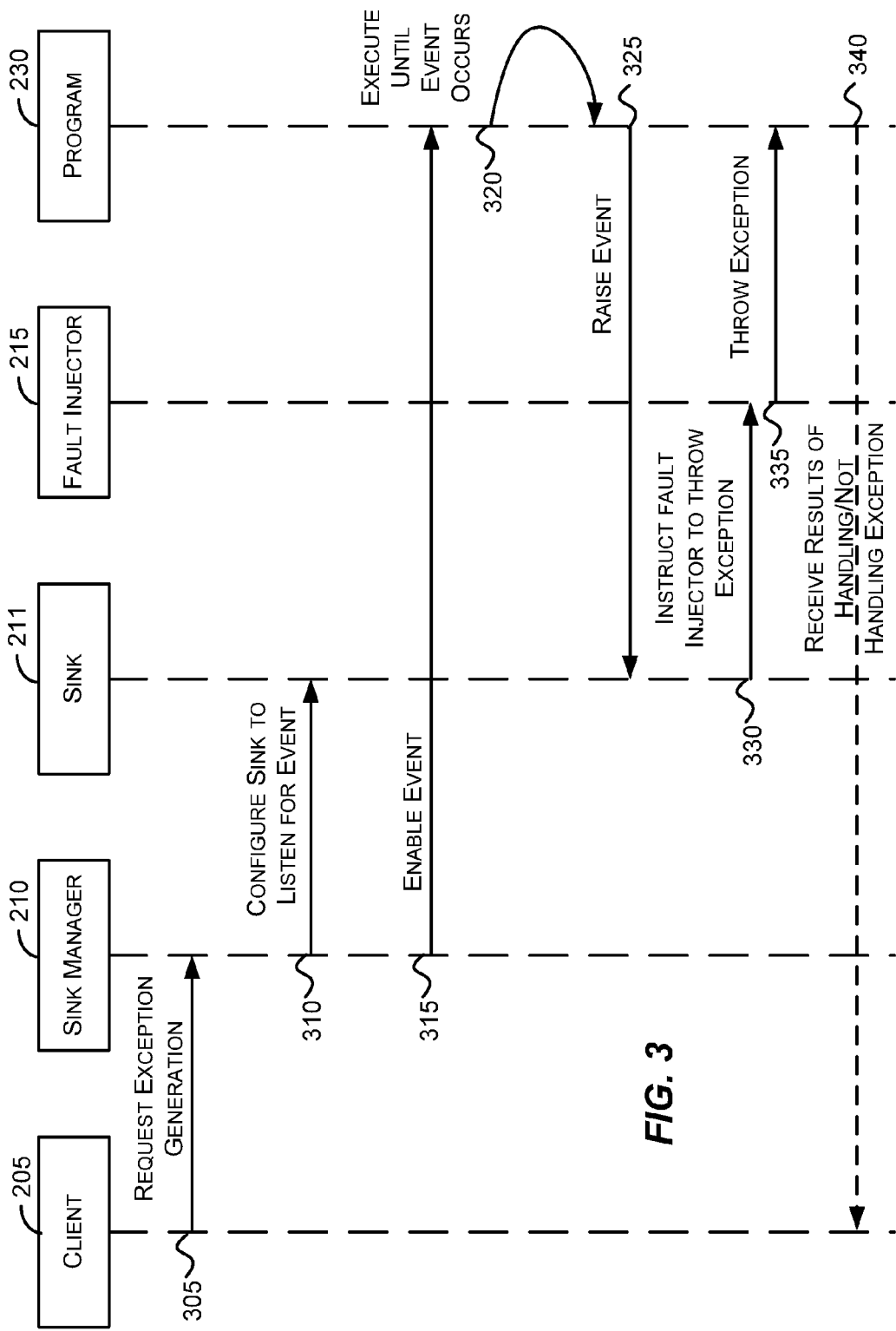
FIG. 3 illustrates a timing diagram in accordance with aspects of the subject matter described herein.

FIG. 3 illustrates a timing diagram in accordance with aspects of the subject matter described herein. At time 305, the client 205 requests that the sink manager 210 cause an exception to be generated when the program 230 generates an event indicated by the client 205. In response, at time 310, the sink manger 210 configures the sink 211 to listen for the event. At time 315, the sink manager 210 enables the event for the program 230 so that the event will be generated at the appropriate time.

At time 320, the program 230 executes until the event occurs. At time 325, the event is raised. The raised event is received by the sink 211. At time 330, the sink 211 instructs the fault injector 215 to raise an exception in the program 230. At time 335, the fault injector 215 raises the exception for the program 230.

At time 340, data regarding how the program 230 responded to the exception is obtained by the client 205. Either the program 230 handles or does not handle the exception appropriately and results are provided/obtained by the client 205.

Figure 4:
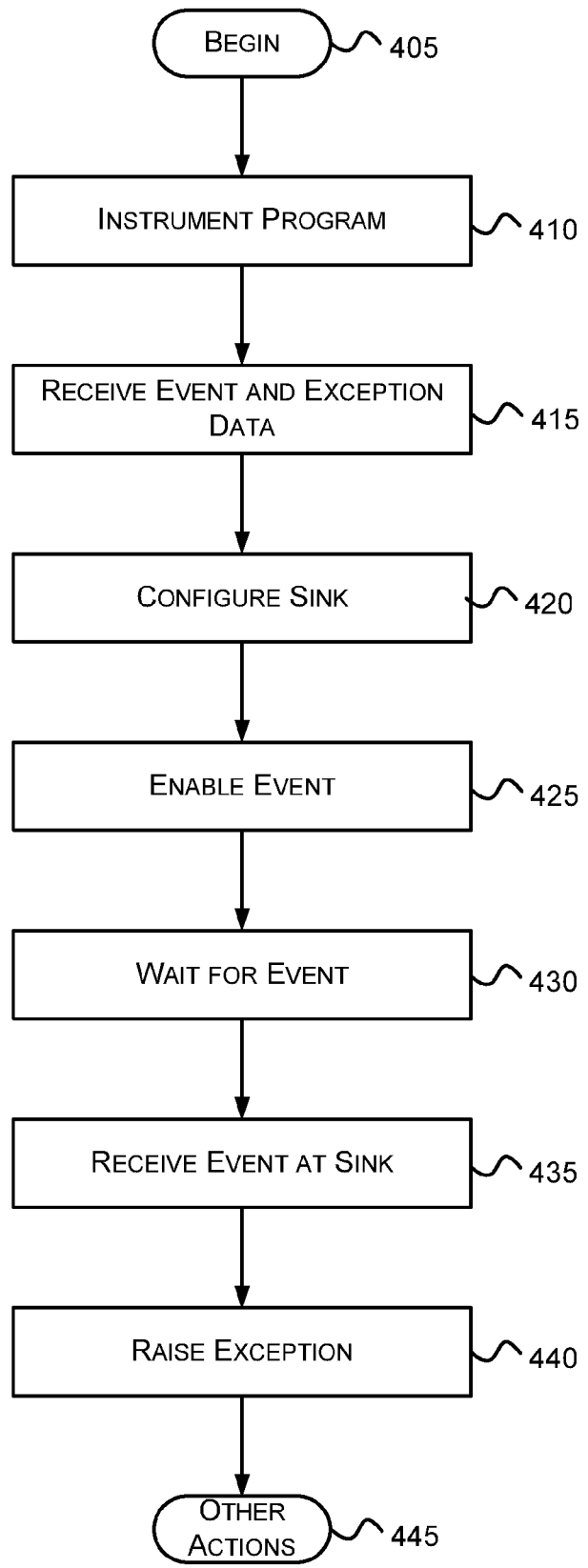
FIGS. 4-5 are flow diagrams that generally represent exemplary actions that may occur in accordance with aspects of the subject matter described herein.
Figure 5:
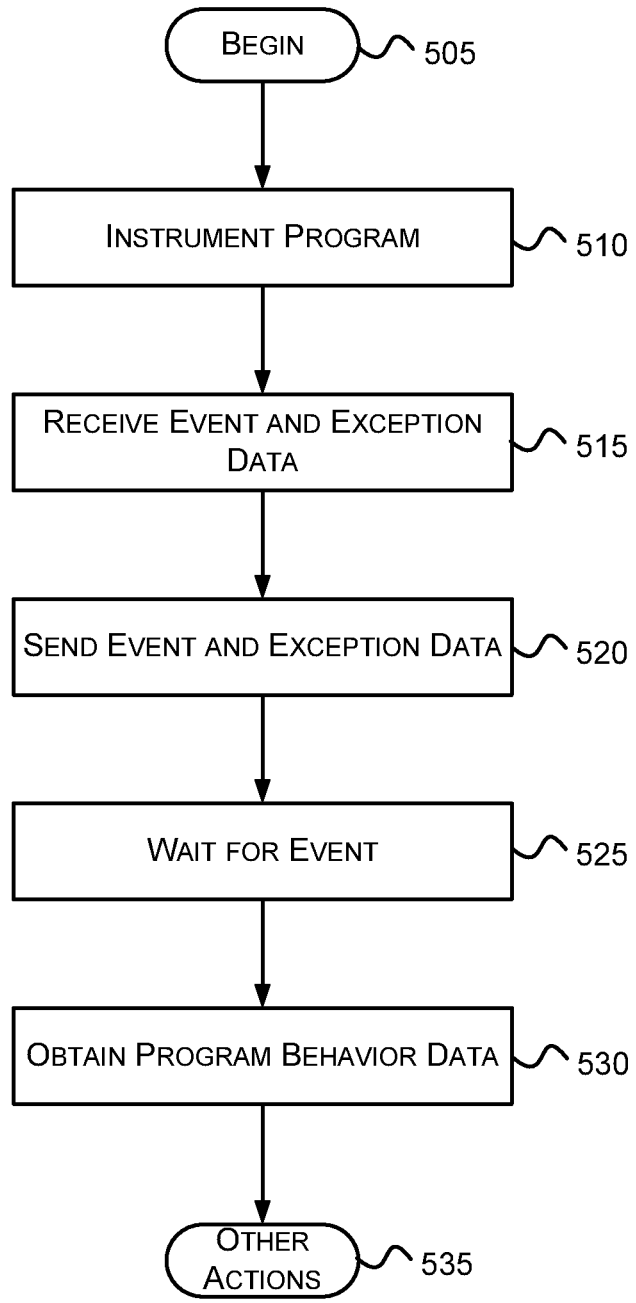

FIGS. 4-5 are flow diagrams that generally represent exemplary actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 4, at block 405, the actions begin. At block 410, a program is instrumented. For example, referring to FIG. 2, a software developer (not shown) may instrument the program 230 via a user interface (e.g., Web browser, software development tool, proprietary software, or the like) provided by the instrumentor 235.

At block 415, even and exception data are received. For example, referring to FIG. 2, the sink manager 210 may receive an event indicator and exception data of an exception from the client 205.

At block 420, a sink is configured to listen for the event and to cause the exception to be raised in the program in response to the event. For example, referring to FIG. 2, the sink manager 210 may configure the sink 211 using the event indicator and exception data received at block 415.

At block 425, the event is enabled. For example, referring to FIG. 2, the sink manager 210 may enable the event so that the event is generated when the instrumentation point associated with the event is reached by the program 230. In one embodiment, configuring the sink to listen for the event automatically causes the event to be enabled. In this embodiment, the actions of blocks 420 and 425 may be combined.

At block 430, waiting may occur to wait for the event. For example, referring to FIG. 2, the sink 211 may wait to be notified that the event has occurred.

At block 435, notification of the event is received at the sink. For example, referring to FIG. 4, the sink 211 may receive a message that indicates that the event has occurred.

At block 440, an exception is raised to the program. For example, referring to FIG. 2, the sink 211 may raise the exception in the program 230 via the fault injector 225.

At block 445, other actions, if any, may be performed.

Turning to FIG. 5, at block 505, the actions begin. At block 510, a program is instrumented. For example, referring to FIG. 2, a software developer (not shown) may instrument the program 230 via a user interface (e.g., Web browser, software development tool, proprietary software, or the like) provided by the instrumentor 235.

At block 515, event and exception data corresponding to the event are received. For example, referring to FIG. 2, the client 205 may receive input from a browser that indicates the event identifier and the exception data.

At block 520, the event and exception data is sent to a mechanism for raising the exception in response to the event. For example, referring to FIG. 2, the client sends the event identifier and exception data to the sink manager 210 to configure a sink to listen for an event of a program 230 and to cause an exception identified by the exception data to be raised in the program 230 in response to the event. As described previously, the event is associated with an instrumentation point of the program and the sink is operable to cause the exception to be raised without modifying code of the program.

At block 525, waiting may occur to wait for the event. For example, referring to FIG. 2, the client 205 may wait to be notified that an event has occurred so that the client 205 may obtain data that indicates how the program 230 responded to the exception.

At block 530, data is obtained that indicates how the program responded to the exception. For example, referring to FIG. 3, the client 205 may obtain data that indicates how the program 230 handled/did not handle the exception.

At block 535, other actions, if any, may be performed.

As can be seen from the foregoing detailed description, aspects have been described related to injecting faults into programs for testing. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computing device having a processor, the method comprising:
   with the processor,
   monitoring for a notification of an event from a program during execution, the program being configured to generate the notification at a target execution point of the program;
   in response to the monitored notification of the event, causing an exception to be raised at the target execution point in the program without the program being under conditions that would otherwise cause the exception to be raised in the program and without modifying code of the program, the exception indicating to the program that an action of the program is not executed normally;
   obtaining data regarding how the program responds to the raised exception; and
   allowing determination of whether the program correctly handles the exception based on the obtained data.

2. The method of claim 1 wherein causing the exception to be raised includes causing at least one of a file operation failure or a memory allocation failure to be raised at the target execution point.

3. The method of claim 1 wherein the event includes one of a entry into a routine, exiting from a routine, setting a variable value, establishing a connection, or terminating a connection.

4. The method of claim 1 wherein raising the exception to the program includes raising the exception to the program without modifying binary, byte, or source code of the program.

5. The method of claim 1 wherein raising the exception to the program includes raising the exception and at least one other exception to the program in response to the monitored notification of the event.

6. The method of claim 1 wherein raising the exception to the program includes raising the exception in parallel with executing a line of code of the program associated with the target execution point, after the line of code but before any other lines of code are executed, or at a target time after the line of code is executed.

7. The method of claim 1, further comprising, in response to the monitored notification of the event, transmitting a message to the program, the message indicating to the program that the notification of the event is processed.

8. A computer storage medium excluding propagating signals per se, the computer storage medium containing instructions, that when executed by a computing processor, causing the computing processor to perform a process comprising:
   receiving a definition of a sink for testing a program, the sink being configured to:
   monitor for a notification of an event from a program during execution, the program being configured to generate the notification at a target execution point of the program; and
   in response to the monitored notification of the event, cause an exception to be raised at the target execution point in the program without the program
   being under conditions that would otherwise cause the exception to be raised in the program and without modifying code of the program, the exception indicating to the program that an action of the program is not executed normally;
   collecting data regarding how the program responds to the raised exception; and
   presenting the collected data to a program tester to determine if the program correctly handles the raised exception.

9. The computer storage medium of claim 8 wherein the event is a first event, and wherein receiving the definition of the sink includes receiving a definition of the sink that is also configured to monitor for a notification of a second event from the program during execution, the second event being different from the first event.

10. The computer storage medium of claim 8 wherein:
    the raised exception is a first exception;
    receiving the definition of the sink includes receiving the definition of the sink that is also configured to, in response to the monitored notification of the event, cause a second exception to be raised in the program without the program being under conditions that would otherwise cause the second exception to be raised in the program; and
    the second exception is different from the first exception.

11. The computer storage medium of claim 8 wherein receiving the definition of the sink includes receiving the definition of the sink that is configured to, in response to the monitored notification of the event, cause a plurality of additional exceptions to be raised in the program without the program being under conditions that would otherwise cause the plurality of additional exceptions to be raised in the program.

12. The computer storage medium of claim 8 wherein receiving the definition of the sink includes receiving the definition of the sink that is configured to, in response to the monitored notification of the event, cause a plurality of additional exceptions to be raised in the program without the program being under conditions that would otherwise cause the plurality of additional exceptions to be raised in the program, the additional exceptions being raised at the target execution point in the program.

13. The computer storage medium of claim 8 wherein receiving the definition of the sink includes receiving the definition of the sink that is configured to, in response to the monitored notification of the event, cause the exception to the program to be raised in parallel with executing a line of code of the program associated with the target execution point, after the line of code but before any other lines of code are executed, or at a target time after the line of code is executed.

14. The computer storage medium of claim 8 wherein receiving the definition of the sink includes receiving the definition of the sink that is configured to, in response to the monitored notification of the event, transmit a message to the program, the message indicating to the program that the notification of the event is processed.

15. A computing system, comprising:
a computing processor; and
a memory operatively coupled to the computing processor, the memory containing instructions, that when executed by the computing processor, cause the computing processor to perform operations comprising:
performing execution of a program having an executing point corresponding to a line of code in the program, the program being configured to generate a notification when the execution of the program reaches the execution point;
monitoring for and detecting the generated notification from the program during execution;
in response to the detected notification from the program, injecting an exception into the execution of the program at the target execution point without the program being under conditions that would otherwise cause the exception and without modifying the code of the program, the exception indicating to the program that an action of the program is not executed normally;
collecting data regarding how the program responds to the injected exception; and
presenting the collected data to a program tester to determine if the program correctly handles the injected exception.

16. The computing system of claim 15 wherein injecting the exception includes injecting at least one of a file operation failure or a memory allocation failure at the execution point.

17. The computing system of claim 15 wherein the line of code of the program corresponds to one of a entry into a routine, exiting from a routine, setting a variable value, establishing a connection, or terminating a connection.

18. The computing system of claim 15 wherein:
the injected exception is a first exception;
injecting the exception includes injecting a second exception into the execution of the program without the program being under conditions that would otherwise cause the second exception to be raised in the program; and
the second exception is different from the first exception.

19. The computing system of claim 15 wherein injecting the exception includes injecting the exception in parallel with executing a line of code of the program associated with the target execution point, after the line of code but before any other lines of code are executed, or at a target time after the line of code is executed.

20. The computing system of claim 15 wherein the operations further include transmitting a message to the program, the message indicating to the program that the notification is processed.

* * * * *